(12) United States Patent
Swiegers et al.

(10) Patent No.: US 6,520,118 B2
(45) Date of Patent: Feb. 18, 2003

(54) ANIMAL ACTUATED APPLICATOR

(75) Inventors: Willie Swiegers, Pretoria (ZA); Petrus Johannes A. N. Van Niekerk, Pretoria (ZA)

(73) Assignee: Bosluis Patente (EDMS.) Beperk, Pretoria (ZA)

( * ) Notice: Subject to any disclaimer, the term of this patent is extended or adjusted under 35 U.S.C. 154(b) by 0 days.

(21) Appl. No.: 09/967,503

(22) Filed: Sep. 28, 2001

(65) Prior Publication Data

US 2002/0066415 A1 Jun. 6, 2002

Related U.S. Application Data

(63) Continuation of application No. PCT/IB99/00549, filed on Mar. 30, 1999.

(51) Int. Cl.[7] .............................................. A01K 29/00
(52) U.S. Cl. ........................................ 119/666; 119/667
(58) Field of Search .............................. 119/665, 666, 119/667, 669

(56) References Cited

U.S. PATENT DOCUMENTS

| 1,460,561 | A |   | 7/1923  | Peterson           |         |
| 1,696,460 | A | * | 12/1928 | Teyen et al. ..... | 119/666 |
| 3,496,914 | A |   | 2/1970  | Cowan ........... | 119/157 |
| 3,699,928 | A |   | 10/1972 | Cowan ........... | 119/159 |
| 4,459,942 | A | * | 7/1984  | Cauthron ......... | 119/666 |
| 5,630,379 | A | * | 5/1997  | Gerk et al. ..... | 119/667 |
| 5,988,113 | A | * | 11/1999 | Zhioua et al. ... | 119/666 |

FOREIGN PATENT DOCUMENTS

WO             90/06675        6/1990       ..........  A01K/29/00

\* cited by examiner

Primary Examiner—Charles T. Jordan
Assistant Examiner—Elizabeth Shaw
(74) Attorney, Agent, or Firm—Schwegman, Lundberg, Woesner & Kluth, P.A.

(57) ABSTRACT

This invention relates to an animal actuated applicator (10) suitable for applying a fluid such as a pesticide to an animal, the applicator (10) comprising dispensing means (60) for dispensing the fluid and actuating means (12) for actuating the dispensing means. The actuating means (12) includes a base plate (16) which is in use displaced when the animal steps thereon, the degree of displacement being dependent proportionally on the animal's weight being transferred to the base plate (16). The actuating means (12) also includes at least one pressure lever (22) which is operatively associated with the base plate (16) and which is arranged to be displaced in response to the displacement of the base plate (16). An actuator is provided for actuating the dispensing means (60) in response to displacement of the pressure lever (22) to dispense a volume of fluid which is proportional to the animal's weight being transferred to the base plate (16).

24 Claims, 5 Drawing Sheets

US 6,520,118 B2

ANIMAL ACTUATED APPLICATOR

RELATED APPLICATION

This application is a continuation under 35 USC 111(a) of International Application PCT/IB99/00549, with an international filing date of Mar. 30, 1999, published in English (WO 00/57693), which application is incorporated in its entirety by reference.

TECHNICAL FIELD

This invention relates to animal actuated applicator suitable for applying pesticide or like fluids to animals such as livestock and game. In one embodiment of the invention it relates to an animal actuated applicator adapted for dispensing a volume of pesticide or like fluids in proportion to the animal's weight.

BACKGROUND ART

Numerous applicators for applying active ingredients to animals are known and available in the market. Several of these applicators include a so-called stepping plate or treadle and can be actuated by an animal, for example by a hoof of the animal when the animal treads on the stepping plate or treadle. Known applicators however all suffer from at least one particular disadvantage, namely the inability to dispense variable volumes of pesticide or like treating fluids upon actuation in accordance with the weight of an animal to be treated. Consequently smaller and larger animals often receive equal dosages, potentially resulting in overdosing of smaller animals and/or underdosing of larger animals.

Those who are familiar with the art of dosing animals will appreciate that in order to achieve optimal results from dosing an animal with an active ingredient, such as pesticide or the like treatment fluids, the animal must receive a relatively accurate dosage of the treatment fluid as prescribed by a producer thereof, for example 1 ml treatment fluid per 10 kg body mass of the animal to be dosed. Experience has indicated that many difficulties arise concerning the ease and thoroughness of these types of applications, as well as the duration of their effectiveness. The disadvantages associated with known animal actuated applicators primarily result from the fact that the accuracy of each dosage applied to each animal largely depends on where the annual treads on the stepping plate or treadle.

These disadvantages are more clearly illustrated with reference to the following patent specifications. U.S. Pat. No. 4,165,715 discloses an annual spray apparatus including an inclined ground level treadle supported inside a frame, which defines a stall and which is interposed in the path of an animal, the treadle being biased upwardly by resilient means so that the trade is urged downwardly by the forelegs of an animal stepping thereon, thereby charging dispensing means. The animal is dosed as it exits the stall.

One disadvantage associated with this apparatus is that proper functioning of the apparatus is dependent thereon that the animal is situated all the way in the stall with its forelegs on the treadle and the weight of its hindquarters on the ground. If the animal enters the stall only partly, it will not charge the dispensing means accurately and it will not receive an accurate dosage of active ingredient. Another disadvantage is that, even if proper functioning of the apparatus is achieved, the dispensing means is charged in accordance with only a percentage of the animal's weight, since its hindquarters is supported on the ground, with this percentage decreasing if the animal is pregnant. Treatment dosages are generally prescribed in a ratio to the total body mass of an animal and consequently this apparatus is not effective in dispensing accurate dosages of treatment fluids. Also, the construction of the apparatus is such that an animal can not pass over the treadle from both directions.

U.S. Pat. No. 3,884,192 discloses an automatic animal sprayer including two platforms arranged in end to end relation, each having their outer ends pivotally connected to a frame and having their inner ends supported by resilient means. The platforms are movable together in a generally vertical direction downwardly in response to the weight of an animal entering onto either platform. Although being an improvement over the previously discussed apparatus, this apparatus also suffers from the disadvantage that the dosing of the animal will depend on where and for what duration of time the animal steps on the platforms. The platforms are required to move downwardly under the weight of the animal so as to overcome the yielding bias of the resilient means and to actuate a pump, as a consequence of which the dosage received by the animal depends on whether the animal adequately crosses over the platforms. Once the pump has been actuated, an animal weighing, for example, 100 kg and one weighing 200 kg will receive the same dosages. Also, the apparatus is relatively complicated in its construction, necessitating enticement of the animals to cross over the platforms and through the frame-structured passage.

The same or similar disadvantages as set out hereinbefore apply to the apparatus disclosed in U.S. Pat. No. 4,126,104.

U.S. Pat. No. 1,460,561 discloses yet a further device for spraying live stock with a treatment fluid. Particularly, this invention provides for a device that comprises a displaceable treadle that is arranged in communication with a dispensing pump and nozzle arrangement. The treadle is located in a doorway of a hog-house, shed or the like with one end of the treadle pivotally connected to a support frame, the floor or the like support base, and the opposite free end of the treadle connected to an upwardly extending rod that has its upper end connected to the dispensing pump. The treadle is maintained in an elevated position by means of a coil spring, the arrangement by such that as an animal treads on the treadle, it depresses the treadle, which in turn effects dispensing of a volume of treatment fluid onto the animal.

A major disadvantage associated with this device is that the dosing of the animal will depend on the exact position where the animal steps on the treadle. So, for example, an animal with weight X who steps on the treadle at a point closer to the treadle pivot point, will receive a similar dosage than an animal with weight ½X who merely steps on the treadle at a point further away from the treadle pivot point and closer to the free end of the treadle.

The device defines a substantially linear relationship between the degree of depression of the treadle and the volume of treatment fluid dispensed. Consequently, smaller and larger animals often receive inaccurate dosages, not only because the treadle has a set stroke, but also because each animal's dosage depend not so much on the weight of the animal, but on where the animal steps on the treadle. A further associated disadvantage of this device is that repeatability of dosage volumes is impossible. The same animal stepping on the treadle a number of different times each time will receive a different volume of fluid, since the volume dispensed depends on the position where the animal steps on the treadle.

Another disadvantage associated with this type of applicator device is that substantial depression of the treadle is required to effect dispensing of the treatment fluid. However, experience has taught that animals are generally frightened to step onto a surface that gives way under them, as a result of which type of applicator is highly ineffective for use in dosing cattle, game or the like, since the animals simply refuse to walk over the treadle.

OBJECTS OF THE INVENTION

It is accordingly one object of the present invention to overcome or at least minimize the aforementioned disadvantages associated with known applicators by providing an animal actuated applicator adapted to dispense variable volumes of pesticide or like fluids in proportion to the weight of the particular actuating the applicator without the necessity of human assistance.

It is another object of the invention to provide an animal actuated applicator wherein dosing fluids can be dispensed in relation to the weight of the particular animal actuating the applicator, regardless of where, in what manner or for how long the animal treads on the actuating means.

It is another object of the invention to provide an animal actuated applicator that permits animals freely and easily to pass over the applicator in either direction without the necessity of force.

DISCLOSURE OF INVENTION

According to the invention there is provided an animal actuated applicator suitable for apply in a fluid such as a pesticide to an animal, the applicator comprising dispensing means for dispensing the fluid; and
actuating means for actuating the dispensing means, wherein the actuating means includes
a base plate which is in use displaced when the animal steps thereon, the degree of displacement being dependent proportionally on the animal's weight being transferred to the base plate;
at least one pressure lever operatively associated with the base plate and arranged to be displaced in response to the displacement of the base plate; and
an actuator for actuating the dispensing means in response to displacement of the pressure lever to dispense a volume of fluid which is proportional to the animal's weight being transferred to the base plate.

The actuating means may be suitably dimensioned to be at least partially embedded in an animal pathway. Preferably, the actuating means includes a housing for housing the different components of the actuating means. The housing may be embedded in the ground with the base plate being located at ground level, thereby rendering it the least visible to approaching animals.

The actuating means may include restraining means for restraining the vertical downward displacement of the base plate, the restraining means being located within the housing and centered below the base plate.

The pressure lever may be pivotally connectable at one end thereof to a wall of the housing and may be arranged to abut the restraining means at an opposite end thereof. Preferably, the actuating means includes two pressure levers. More preferably, the actuating means includes four pressure levers, operatively associated with corresponding corner sections of the base plate.

The actuating means may further include first abutting means provided on the base plate, the first abutting means bearing on at least one pressure lever when the base plate is displaced. Preferably, each pressure lever is associated with the base plate by first abutting means. The first abutting means may be studs, buttons or the like formations. Alternatively, the pressure levers may be connected to the base plate by shafts, rods, arms or the like formations.

The dispensing means may comprise a piston-actuated pump, Preferably, the dispensing means includes a calibrated piston and sleeve, volumetric metering arrangement. The dispensing means may be housed removably within a chamber, the chamber being suitably dimensioned to be embedded at least partially in the ground adjacent the housing. The dispensing means may be releasably connectable to any suitable irrigation means for administering the fluid to the animal. The irrigation means may for example be a rose, sprinkler, nozzle or the like. The dispensing means further may be releasably connectable to a reservoir for storing a bulk volume of the treatment fluid.

According to one embodiment of the invention the restraining means may be a float, the float being operatively associated with the base plate by means of the pressure levers and arranged to be displaceable vertically in a liquid carrier within the housing in proportion to the animal's weight being transferred to the base plate. In this embodiment the dispensing means may be operatively associated with the float by means of an actuator arm extending from the float, the dispensing means being capable of dispensing a variable volume of fluid in accordance with the vertical displacement of the float.

The float may consist of a low-density body. Preferably the float consists of a low-density panel for floating on the liquid carrier such as water.

In an alternative embodiment of the invention, the resting means may be a spring, for example a coil spring or a laminated spring, operatively associated with the base plate and arranged to be compressed upon displacement of the base plate. The dispensing means may he operatively associated with the actuating means through an actuator arm extending from the pivotally connected end of at least one pressure lever.

Alternatively the restraining means may be magnets, such as permanent magnets or electromagnets, operatively associated with the base plate and arranged to create a repulsive force between them when the animal steps on the base plate so that the repulsive force may be increased in proportion to the animal's weight.

According to yet another embodiment of the invention the actuator may be an electronic arrangement including electronic sensing means, such as a load cell or the like, the electronic sensing means being operatively associated with the base plate by means of the pressure levers and being capable of sensing at least a portion of the animal's weight. In this embodiment, the electronic sensing means may be connected to a microprocessor control unit arranged in communication with the electronic sensing means and adapted to activate the dispensing means to dispense a variable volume of fluid in proportion to the weight of an animal as sensed by the electronic sensing means.

It will be appreciated that the sensitivity of the actuating means to the relative weight of different animals may have a finite range bordered by a predetermined minimum and maximum limit. If in use the animal's weight is below the minimum limit the applicator will not be actuated. If, on the other hand, the animal's weight is above the maximum limit, the dispensing means will dispense a maximum volume of fluid and will not dispense a volume of fluid proportional to the animal's weight.

BRIEF DESCRIPTION OF DRAWINGS

Without limiting the scope thereof the invention will now be described by way of example only with reference to the accompanying figures wherein.

BEST MODE FOR CARRYING OUT THE INVENTION

It will be appreciated that in this description, like numbers refer to like parts.

Figure 1:
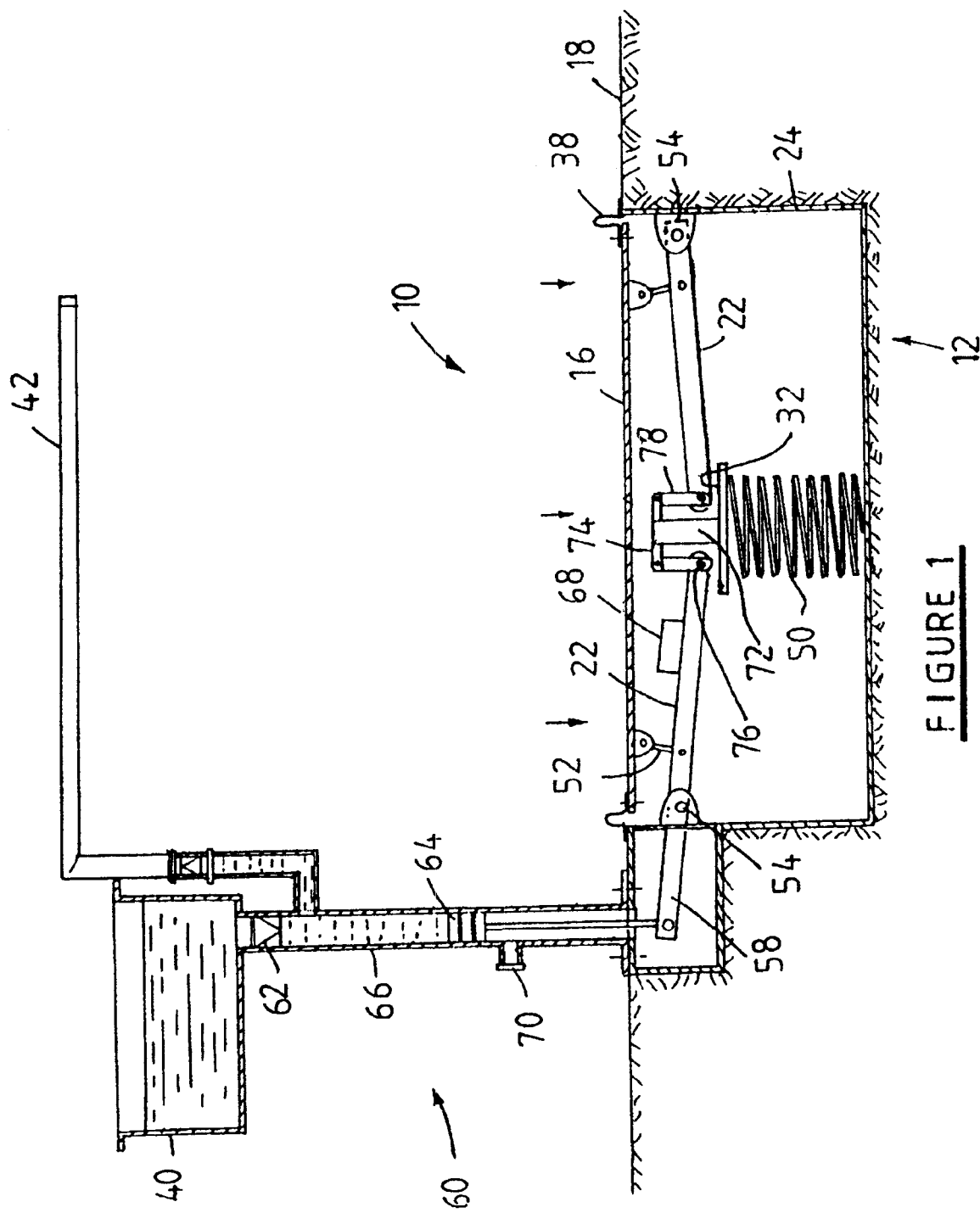
FIG. 1 is a diagrammatic cross-sectional view of an animal actuated applicator according to a first embodiment of the invention.
Figure 2:
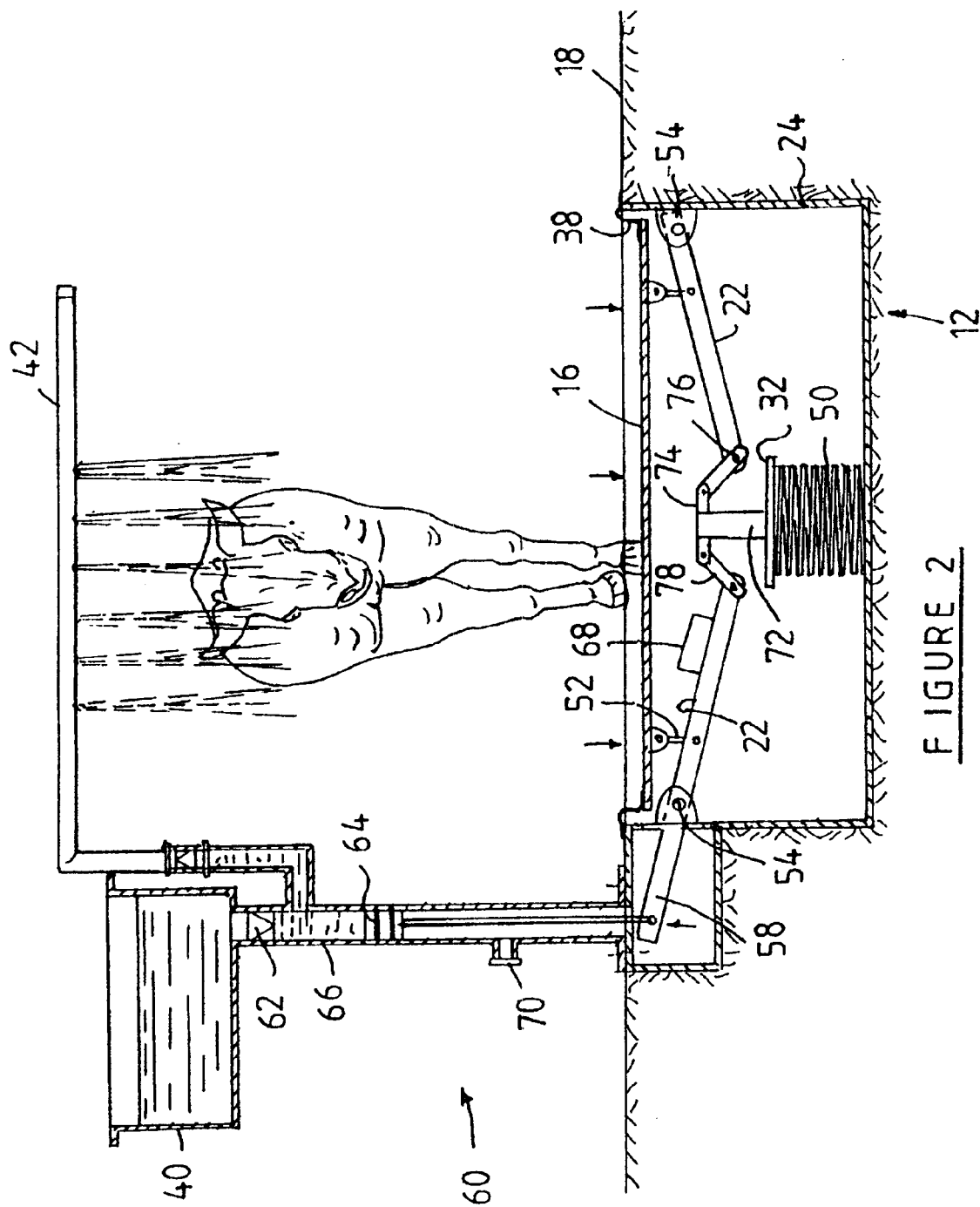
FIG. 2 is a diagrammatic cross-sectional view of the animal actuated applicator of FIG. 1, with the base plate being vertically downward displaced.
Figure 3:
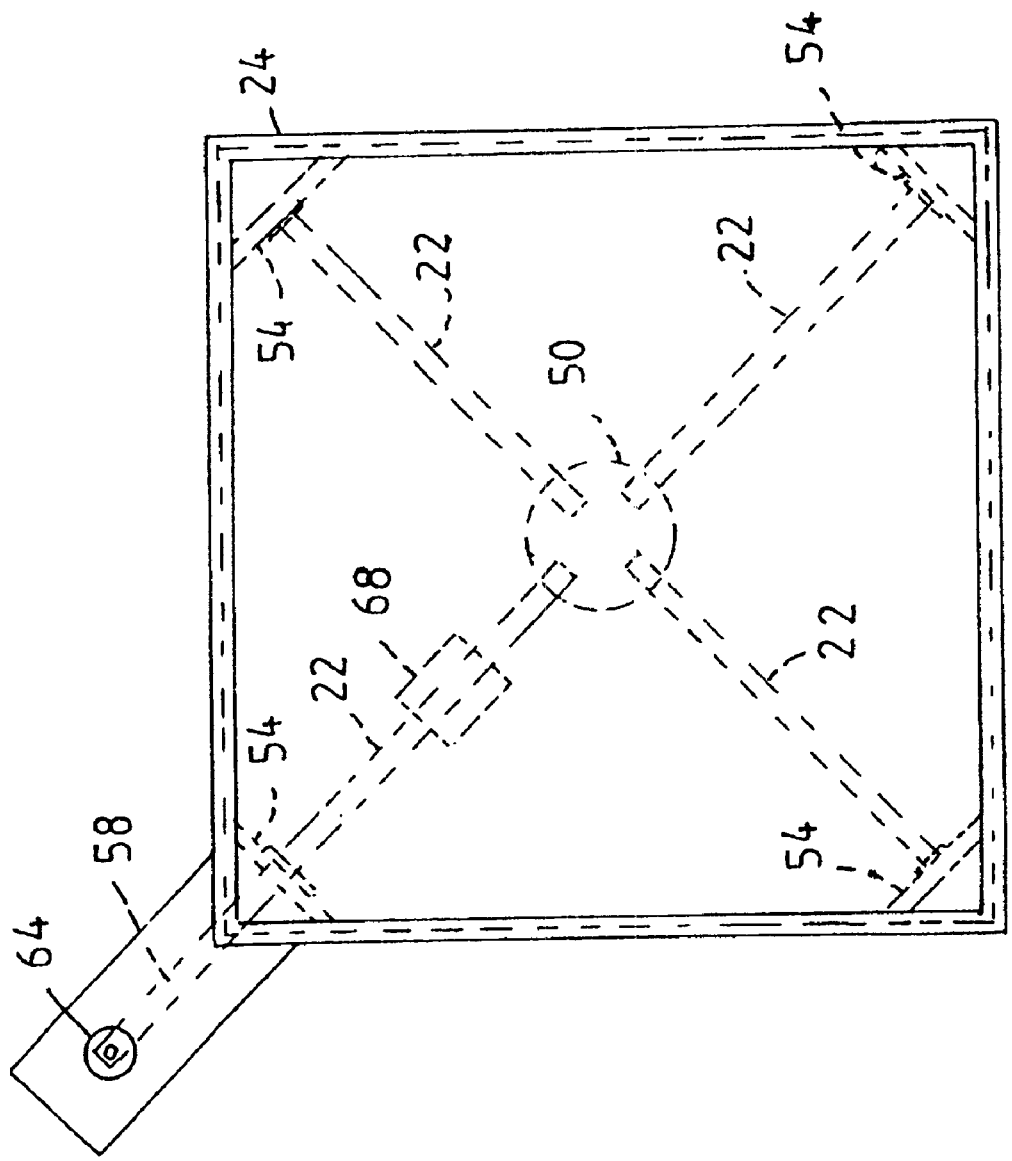
FIG. 3 is a plan view of the applicator of FIGS. 1 and 2.

With reference to FIGS. 1 to 3, an animal actuated applicator according to the invention is generally designated by reference numeral 10 and comprises actuating means 12 and dispensing means 60. The actuating means 12 includes a base plate 16, arranged to be displaced by the weight of an animal treading on the base plate 16. The actuating means 12 are housed within a housing 24 which is embedded in the ground, for example in a pathway of cattle or game, so as to allow the base plate 16 to be located at a level equal to that of the surrounding ground surface 18, thereby rendering it the least visible to approaching animals. The base plate 16 is connected to the walls of the housing 24 by means of flexible couplings 38.

The actuating means 12 also includes four pressure levers 22, each pressure lever 22 being pivotally connected at one end thereof to a wall of the housing 24 by means of pivot means 54.

In this embodiment of the invention, the actuating means 12 includes a coil spring 50 for restraining the vertical downward displacement of the base plate 16, the coil spring 50 preferably having a bottomless stroke. The coil spring 50 is operatively associated with the base plate 16 by means of the pressure levers 22 and is ranged to be compressed when the base plate 16 is displaced. The pressure levers 22 are linked to the base plate 16 by means of movable rods, shafts, arms or the like 52, the rods 52 being linked at one end thereof to the base plate 16 with joint formations, and at an opposite end thereof to the pressure levers 22.

The pressure levers 22 are connected by pivot means 54 at their outer ends to the walls of the housing 24. At their opposite inner ends, the pressure levers 22 include second abutting means 56 for abutting a pressure plate 32 which engages an upper end of the coil spring 50. In use, the pressure levers 22 are horizontally displaceable relative to the pressure plate 32. The second abutting means 56 include a rod of square tubing 72 vertically connected to the pressure plate 32 for supporting a metal loop 74. Each pressure lever 22 includes a pin 76 protruding through an end portion of the pressure lever 22. The pin 76 engages a chain link 78, which also engages the metal loop 74, rendering the pressure lever 22 movable relative to the metal loop 74.

One pressure lever 22 includes an actuator arm 58 extending from the pivotally connected outer end of the pressure lever 22 and is arranged in communication with dispensing means 60. The pressure lever 22 may include means 68 for increasing its weight so as to minimize frictional resistance experienced during operation of the applicator.

The dispensing means 60 include a piston 64 and sleeve 66 arrangement being connected to a reservoir 40 by means of a one-way check valve 62. The dispensing means 60 also include a breather opening 70. The dispensing means 60 is releasably connected to any suitable irrigation means 42 for administering pesticide or the like fluids to an animal.

In use, the animal actuates the applicator by stepping on the base plate 16, causing vertical downward displacement of the base plate 16. A fraction of the animal's weight is transferred to the coil spring 50 by means of the pressure levers 22 and their associated rods 52, and the coil spring 50 is compressed proportionally to that part of the animal's weight which is transferred to the to base plate 16. The arrangement is so that regular linear vertical displacement of the base plate 16 is achieved, regardless of where the animal steps on the base plate 16.

Upon compression of the coil spring 50, the actuator arm 58 forces the piston 64 vertically upward, thereby dispensing fluid through the irrigation means 42 on to the back, sides, belly or rear of the animal as the case may be.

When the animal steps off the base plate 16, the coil spring 50 is released, causing the actuator arm 58 to pull the piston 64 vertically downward Valve 62 is opened and fluid from the reservoir 40 fills the sleeve 66. The applicator is now ready for another application.

It is clearly evident that the degree of vertically downward displacement of the base plate 16 is dependent on the weight of the animal stepping thereon, so that a lesser weight will result in lesser displacement of the base plate 16, while a heavier weight will increase displacement of the base plate 16. Consequently, as a result of the resistance offered by the restraining coil spring 50, wherein the coil spring 50 acts in response to the animal's weight, fluid is dispensed onto the animal in proportion to its weight. In particular, the ratio between the animal's weight and the proportional compression of the coil spring 50 is dependent upon the distance between the pivot means 54 and the rods 52, relative to the total length of the pressure lever 22.

Figure 4:
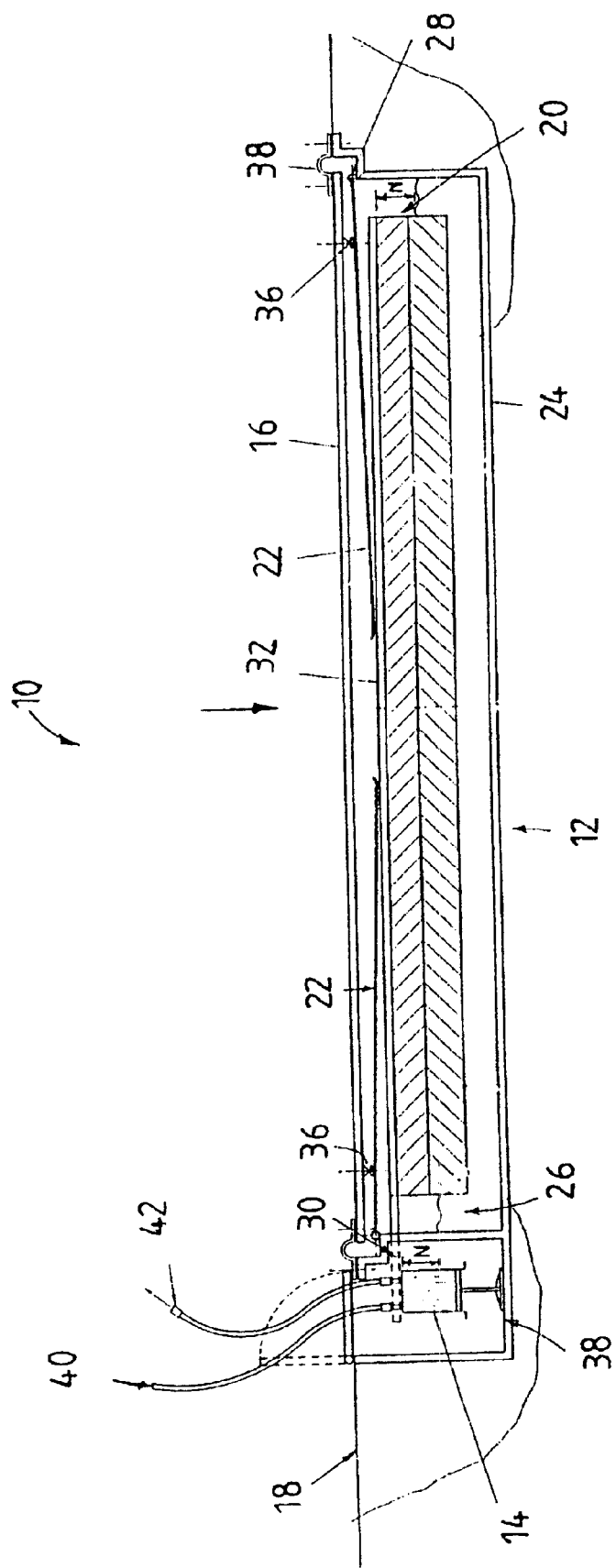
FIG. 4 is a diagrammatic cross-sectional view of an animal actuated applicator according to a second embodiment of the invention.
Figure 5:
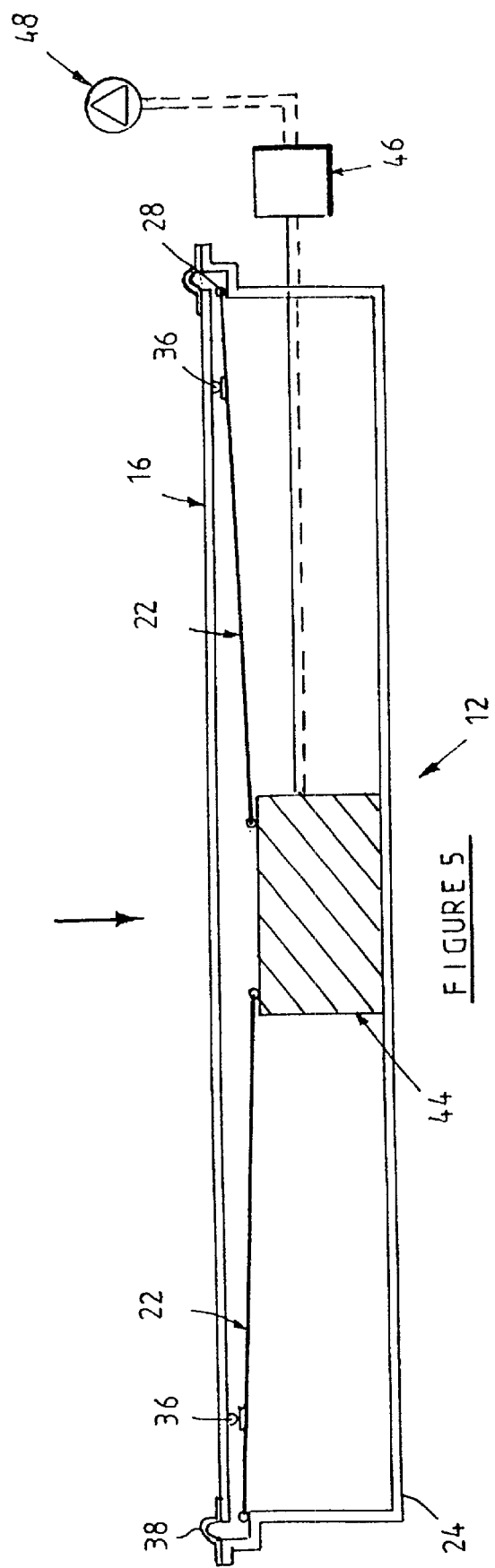
FIG. 5 is a diagrammatic cross-sectional view of an animal actuated applicator according to a third embodiment of the invention.

The same principles as set out hereinbefore apply to the embodiments illustrate in FIGS. 4 and 5. In FIG. 4, the actuating means 12 includes a float 20, operatively associated with the base plate 16 by means of the pressure levers 22. The float 20 is housed within the housing 24 and is adapted to restrain the vertical downward displacement of the base plate 16. In use, the housing 24 is at least partially filled with a liquid carrier 26, for example water, for carrying the float 20. The pressure levers 22 are arranged to be pivotally connected at one end thereof to the housing 24 by means of lever hinges 28 and to abut the float 20 at an opposite end thereof.

The float 20 consists of a panel of relatively low-density material, for example polystyrene. The float 20 is connected to an actuator arm 30 for actuating the dispensing means 14. The float 20 includes a pressure plate 32 at the upper end of the float 20 which extends from the float 20 to form the actuator arm 30.

The actuating means 12 further includes first abutting means 36 associated with each pressure lever 22. In this embodiment the first abutting means 36 are pressure studs or buttons for engaging the base plate 16 with each pressure is lever 22 for transferring at least a portion of the weight of an animal (not shown) stepping on the base plate 16 to the float 20.

Dispensing means 14 includes a piston and sleeve arrangement. The dispensing means 14 is preferably removably housed within a chamber 38, which is also embedded in the ground and arranged adjacent to the housing 24. The dispersing means 14 is releasably connected to a reservoir 40, which is located above the ground surface 18 and distant from the animal actuated applicator 10 and is designed to store a bulk volume of pesticide or like fluids. The dispensing means 14 is also releasably connected to any suitable irrigation means 42.

In use the animal actuates the applicator by treading on the base plate 16. A fraction of the animal's weight is transferred to the float 20 by the first abutting means 36 pressing on the pressure levers 22, which in turn press on the pressure plate 32 attached to the float 20. The float 20 is vertically downward displaced in the housing 24 through a distance N. Simultaneously, the actuator arm 30 actuates the dispensing means 14 so as to compress the piston and sleeve arrangement of the dispersing means 14 through the distance N. The dispensing means 14 dispenses a volume of pesticide or like fluids through the irrigation means 42, the dispensed volume corresponding to the vertical downward displacement of the float 20 in the housing 24. Upon removal of the animal's weight from the base plate 16, the float 20 returns to its original position, allowing the actuating arm 30 to decompress the piston and sleeve arrangement of the dispensing means 14, whereby the dispensing means 14 is refilled with pesticide or like fluids from the reservoir 40.

At least a fraction of the animal's weight is transferred to the float 20, the weight being transferred being dependent upon the location of the first abutting means 36 relative to the pressure lever 22. More specifically, the ratio between the animal's weight and the proportional vertical displacement of the float 20 is dependent upon the distance between the lever hinge 28 and the first abutting means 36, relative to the total length of the pressure lever 22. It is envisaged that the location of the first abutting means 36 could be varied to accommodate animals of different nominal weight groups to be dosed with the animal actuated applicator according to the invention.

Referring now to FIG. 5, the actuating means 12 includes an electronic sensing means, for example a load cell 44, operatively associated with the base plate 16 by means of the pressure levers 22. The load cell 44 is removably housed within the housing 24. The load cell 44 is arranged in communication with a microprocessor control unit 46, which in turn is connected to any suitable dispensing means 48.

In use the animal actuates the applicator by treading on the base plate 16. At least a fraction of the animal's weight is transferred to the load cell 44, the weight fraction being transferred being dependent upon the distance between the lever hinge 28 and the first abutting means 36, relative to the total length of the pressure lever 22. The microprocessor control unit 46 receives a signal from the load cell 44 and responds by activating the dispensing means 48, for example an electrical pump arrangement, to dispense a volume of pesticide or like fluids proportion to the animal's weight.

It will be appreciated that many other embodiments of the invention are possible without departing from the scope of the invention as defined in the claims.

What is claimed is:

1. An animal actuated applicator suitable for applying a fluid to an animal, the applicator comprising:
   a base plate which is in use displaced when the animal steps thereon;
   a dispenser adapted for dispensing the fluid,
   at least one pressure lever operatively associated with the base plate and arranged to be displaced in response to the displacement of the base plate, the degree of displacement being proportional to the animal's weight transferred to the base plate; and
   an actuating member including
      an actuator for actuating the dispenser in response to displacement of the pressure lever to dispense a volume of fluid which is proportional to the animal's weight transferred to the base plate; and
      a first abutting member provided on the base plate, the first abutting member bearing on the pressure lever when the base plate is displaced;
   wherein the actuating member has a sensitivity to the relative weight of different animals, the sensitivity having a finite range bordered by a predetermined minimum limit and maximum limit.

2. The animal actuated applicator according to claim 1 characterized in that the actuating member includes a restraining member adapted for restraining the degree of displacement of the base plate.

3. The animal actuated applicator according to claim 2 characterized in that the restraining member is a coil spring operatively associated with the base plate and arranged to be compressed upon displacement of the base plate.

4. The animal actuated applicator according to claim 1 characterized in that the actuating member is suitably dimensioned to be at least partially embedded in the ground.

5. The animal actuated applicator according to claim 4, characterized in that the actuating member includes a housing, the housing being embedded in the ground with the base plate being located at ground level.

6. The animal actuated applicator according to claim 5 characterized in that the pressure lever is pivotally connected at one end thereof to a wall of the housing and arranged to abut the restraining member at an opposite end thereof.

7. The animal actuated applicator according to claim 1 characterized in that the dispenser comprises a piston actuated pump and an irrigator connected to the pump, the irrigator being adapted for administering the fluid to the animal in an amount proportional to an animal's weight on the base plate.

8. The animal actuated applicator according to claim 7 characterized in that the dispenser includes a reservoir releasably connected to the pump and adapted for storing a bulk volume of the treatment fluid.

9. The animal actuated applicator according to claim 1 characterized in that the actuating member includes an actuator arm, the dispenser is operatively associated with the actuator arm extending from a pivotally connected end of at least one pressure lever.

10. The animal actuated applicator according to claim 1, wherein the pressure lever includes at least one of a shaft, an arm, or a rod that connect to the base plate.

11. The animal actuated applicator of claim 1, wherein the fluid includes a pesticide.

12. An animal actuated applicator suitable for applying a fluid such as a pesticide to an animal, the applicator comprising:
   a base plate which is in use displaced when the animal steps thereon;
   a dispenser adapted for dispensing the fluid,
   at least one pressure lever operatively associated with the base plate and arranged to be displaced in response to the displacement of the base plate, the degree of displacement being proportional to the animal's weight transferred to the base plate; and
   an actuating member including an actuator for actuating the dispenser in response to displacement of the pressure lever to dispense a volume of fluid which is proportional to the animal's weight transferred to the base plate; and
an first abutting member provided on the base plate, the first abutting member bearing on the pressure lever when the base plate is displaced; and
wherein the at least one pressure lever includes four pressure levers.

13. The animal actuated applicator according to claim 6, wherein the pressure levers include at least one of a shaft, an arm, or a rod that connect to the base plate.

14. An animal actuated applicator suitable for applying a fluid such as a pesticide to an animal, the applicator comprising:
a base plate which is in use displaced when the animal steps thereon;
a dispenser adapted for dispensing the fluid,
at least one pressure lever operatively associated with the base plate and arranged to be displaced in response to the displacement of the base plate, the degree of displacement being proportional to the animal's weight transferred to the base plate; and
an actuating member including
an actuator for actuating the dispenser in response to displacement of the pressure lever to dispense a volume of fluid which is proportional to the animal's weight transferred to the base plate;
an abutting member provided on the base plate, the first abutting member bearing on the pressure lever when the base plate is displaced; and
a restraining member adapted for restraining the degree of displacement of the base plate;
wherein the restraining member includes a float, the float being operatively associated with the base plate by the at least one pressure lever and arranged to be displaceable vertically in a liquid carrier within the housing in proportion to the animal's weight.

15. The animal actuated applicator according to claim 14 characterized in that the dispenser includes an actuator arm operatively associated with the float, the dispenser being adapted to dispense a variable volume of fluid in accordance with the vertical displacement of the float.

16. An animal actuated applicator suitable for applying a fluid such as a pesticide to an animal, the applicator comprising:
a base plate which is in use displaced when the animal steps thereon;
a dispenser adapted for dispensing the fluid,
at least one pressure lever operatively associated with the base plate and arranged to be displaced in response to the displacement of the base plate, the degree of displacement being proportional to the animal's weight transferred to the base plate; and
an actuating member including
an actuator for actuating the dispenser in response to displacement of the pressure lever to dispense a volume of fluid which is proportional to the animal's weight transferred to the base plate; and
an abutting member provided on the base plate, the first abutting member bearing on the pressure lever when the base plate is displaced;
wherein the actuator includes an electronic sensor, the electronic sensor being operatively associated with the base plate by the pressure lever and being capable of acting in response to at least a portion of the animal's weight.

17. The animal applicator according to claim 16 characterized in that the dispenser includes a microprocessor control unit, the electronic sensor is connected to the microprocessor control unit and the microprocessor control unit being adapted to activate the dispenser to dispense a variable volume of fluid in proportion to the weight of an animal.

18. The animal actuated applicator according to claim 17 characterized in that the sensitivity of the actuator to the relative weight of different animals has a finite range bordered by a predetermined minimum and maximum limit.

19. An animal actuated applicator suitable for applying a fluid such as a pesticide to an animal, the applicator comprising:
a housing;
a base plate which is in use displaced when the animal steps thereon;
a dispenser adapted for dispensing the fluid,
at least one pressure lever operatively associated with the base plate and arranged in the housing, the at least one pressure lever being adapted to be displaced in response to the displacement of the base plate, the degree of displacement being proportional to the animal's weight transferred to the base plate; and
an actuating member including:
an actuator for actuating the dispenser in response to displacement of the pressure lever to dispense a volume of fluid which is proportional to the animal's weight transferred to the base plate;
an abutting member provided on the base plate, the first abutting member bearing on the pressure lever when the base plate is displaced; and
a restraining member adapted for restraining the degree of displacement of the base plate;
wherein the pressure lever is pivotally connected at one end thereof to a wall of the housing and arranged to abut the restraining member at an opposite end thereof.

20. An animal actuated applicator suitable for applying a fluid to an animal, comprising:
a housing including a wall;
a base plate adapted to be displaced when the animal steps thereon;
a dispenser adapted for dispensing the fluid,
at least one pressure lever pivotally connected at a first end thereof to the wall of the housing, the pressure lever being operatively associated with the base plate and arranged to be displaced in response to the displacement of the base plate, the degree of displacement being proportional to the animal's weight transferred to the base plate; and
an actuating member including:
an actuator for actuating the dispenser in response to displacement of the pressure lever to dispense a volume of fluid which is proportional to the animal's weight transferred to the base plate;
an abutting member provided on the base plate, the abutting member bearing on the pressure lever when the base plate is displaced;
a spring abutting a second end of the pressure lever, the spring being operatively associated with the base plate and arranged to be compressed upon displacement of the base plate to thereby restrain displacement of the base plate; and
an actuator arm connected to the pivotally connected first end of the at least one pressure lever, the dispenser being operatively associated with the actuator arm.

21. An animal actuated applicator suitable for applying a fluid to an animal, the applicator comprising:
- a base plate which is adapted to displace when the animal steps thereon;
- a dispenser adapted for dispensing the fluid,
- a plurality of pressure levers operatively associated with the base plate and arranged to be displaced in response to the displacement of the base plate, the degree of displacement being proportional to the animal's weight transferred to the base plate; and
- an actuating member including:
  - an actuator for actuating the dispensing means in response to displacement of the pressure lever to dispense a volume of fluid which is proportional to the animal's weight transferred to the base plate; and
  - a plurality of abutting members provided on the base plate, the plurality of abutting members bearing on the plurality of pressure levers when the base plate is displaced.

22. The animal actuated applicator according to claim 21, wherein the plurality of pressure levers includes one pressure lever extending to each corner of the base plate.

23. The animal actuated applicator according to claim 21, wherein the base plate includes four corners and the plurality of pressure levers include four pressure levers.

24. The animal actuated applicator according. to claim 21, wherein the dispenser is adapted to dispense a pesticide fluid.

* * * * *